UNITED STATES PATENT OFFICE.

LEOPOLD GLEICHMAR, OF RUDOLSTADT, GERMANY.

PROCESS OF PRODUCING BUILDING-BLOCKS.

SPECIFICATION forming part of Letters Patent No. 644,766, dated March 6, 1900.

Application filed January 2, 1900. Serial No. 136. (No specimens.)

*To all whom it may concern:*

Be it known that I, LEOPOLD GLEICHMAR, a subject of the German Emperor, residing at Rudolstadt, Germany, have invented certain new and useful Improvements in Processes of Producing Building-Blocks, of which the following is a specification.

My invention relates to the manufacture of building-blocks; and it consists in the process of making the same hereinafter claimed.

In carrying out my invention I take two parts of crude linseed-oil, two parts of castor-oil, (Ricinus oil,) and one-half part of rosin. These ingredients are melted together in a steam-pot, and I then add to the mixture sufficient pulverized marble to bring the mixture to the consistency of a thin paste. The mixture is then boiled for six hours and cooled or allowed to cool. When the mixture has cooled, I stir in pulverized marble and sand of equal parts until the mass has assumed the form of a loose powder. This powder may be pressed in suitable forms into building-blocks.

I employ castor-oil for the purpose of giving the blocks great toughness, so as to prevent the corners and edges of the blocks from breaking off easily and to neutralize the disagreeable odor that results when linseed-oil alone is used. Linseed-oil and castor-oil produce with the marble-dust a putty-like substance. The marble-dust is employed for the purpose of giving the stones a soft appearance. The stones may also be polished, which polish is increased by the addition of rosin.

Having described my invention, what I claim, and desire to secure by Letters Patent, is—

1. The process of manufacturing blocks which consists in melting together linseed-oil and castor-oil adding thereto pulverized marble, boiling the mixture and subsequently adding marble and sand and compressing the mass into suitable shapes.

2. The herein-described process of manufacturing blocks which consists in boiling crude linseed-oil, castor-oil and marble-dust and thereupon adding a granular substance composed in part of marble-dust and thereupon compressing the mass into suitable shapes.

3. The herein-described process of producing blocks the same consisting in heating linseed-oil, castor-oil and marble-dust and thereupon adding to the mass a granular material comprised in part of marble-dust and thereupon compressing the mass into suitable shapes.

LEOPOLD GLEICHMAR.

Witnesses:
C. PETZULER,
RUDOLPH FRICKE.